(12) United States Patent
Bledsoe et al.

(10) Patent No.: US 10,715,015 B2
(45) Date of Patent: *Jul. 14, 2020

(54) ELECTRIC MACHINE WITH COMBINED INSULATOR AND TERMINAL ASSEMBLY

(71) Applicant: BorgWarner, Inc., Auburn Hills, MI (US)

(72) Inventors: Christopher Bledsoe, Anderson, IN (US); Kirk Neet, Pendleton, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,976

(22) Filed: Dec. 14, 2018

(65) Prior Publication Data

US 2019/0123624 A1    Apr. 25, 2019

Related U.S. Application Data

(60) Continuation-in-part of application No. 14/958,511, filed on Dec. 3, 2015, now Pat. No. 10,186,938.
(Continued)

(51) Int. Cl.
H02K 15/00 (2006.01)
H02K 19/36 (2006.01)
(Continued)

(52) U.S. Cl.
CPC ........... *H02K 15/00* (2013.01); *H02K 11/046* (2013.01); *H02K 11/05* (2016.01); *H02K 19/365* (2013.01); *Y10T 29/49151* (2015.01)

(58) Field of Classification Search
CPC .... H02K 11/04; H02K 11/046; H02K 16/365; H02K 19/365
(Continued)

(56) References Cited

U.S. PATENT DOCUMENTS 6,285,100 B1 *  9/2001  Pflueger .............. H02K 11/046
                                                                310/64
6,307,289 B1 * 10/2001  Skala .................. H02K 11/046
                                                                310/68 D
(Continued)

FOREIGN PATENT DOCUMENTS

DE   102011080886 A1   2/2013
EP       0969583 A1   1/2000
(Continued)

OTHER PUBLICATIONS

International Search Report and Written Opinion of PCT/US2015/024746, dated Jul. 27, 2015.
(Continued)

*Primary Examiner* — Alfonso Perez Borroto
*Assistant Examiner* — Leda T Pham
(74) *Attorney, Agent, or Firm* — Maginot, Moore & Beck LLP

(57) ABSTRACT

An electronics package for an alternator includes a positive carrier member having an inner side and an outer side, a plurality of switches connected to the positive carrier member, and a terminal assembly engaging the positive carrier member. The terminal assembly includes an electrically insulative portion and a plurality of electrical traces attached to the electrically insulative portion. The electrically insulative portion includes a post extending from the inner side to the outer side of the positive carrier member, a first shoulder engaging the outer side of the positive carrier member, and a second shoulder engaging the inner side of the positive carrier member. The second shoulder is provided by a deformed segment of the post. The post, first shoulder, and second shoulder are all formed as a unitary component.

18 Claims, 8 Drawing Sheets

Related U.S. Application Data which is a division of application No. 14/250,688, filed on Apr. 11, 2014, now Pat. No. 9,627,948.

(51) Int. Cl.
*H02K 11/04* (2016.01)
*H02K 11/05* (2016.01)

(58) Field of Classification Search
USPC .................................................. 310/68 D
See application file for complete search history.

(56) References Cited

U.S. PATENT DOCUMENTS

| | | |
|---|---|---|
| 7,282,825 B2 | 10/2007 | Sakakibara |
| 2002/0047397 A1 | 4/2002 | Osawa |
| 2003/0102735 A1 | 6/2003 | Asao |
| 2003/0198068 A1 | 10/2003 | Bradfield |
| 2007/0210662 A1 | 9/2007 | Bradfield |
| 2008/0084128 A1 | 4/2008 | Neet |
| 2008/0265700 A1 | 10/2008 | Bradfield |

FOREIGN PATENT DOCUMENTS

| | | |
|---|---|---|
| JP | 2002136076 A | 5/2002 |
| JP | 2011193596 A | 9/2011 |

OTHER PUBLICATIONS

Chinese Office Action in corresponding application, dated May 30, 2018.

\* cited by examiner

ELECTRIC MACHINE WITH COMBINED INSULATOR AND TERMINAL ASSEMBLY

CROSS-REFERENCE TO RELATED APPLICATIONS

This application is a continuation-in-part of U.S. patent application Ser. No. 14/958,511, filed Dec. 3, 2015, which is a divisional of U.S. patent application Ser. No. 14/250,688, filed Apr. 11, 2014, now U.S. Pat. No. 9,627,948, the entire contents of which are incorporated herein by reference.

FIELD

This application relates to the field of electric machines, and more particularly to an insulation arrangement for an electronic component package including a rectifier that is mounted to the electric machine.

BACKGROUND

Vehicle alternators produce three-phase alternating current that is rectified into a direct current. The associated voltage can be stored in a battery of a vehicle or be used directly by the electrical circuit of the vehicle, which is supplied with a direct current (DC) voltage. Rectification of the three-phase alternating current may be obtained by means of a rectifier bridge having six power switches. The rectification of an n-phase alternating current may be obtained by means of a rectifier bridge having 2*n power switches. Commonly, a rectification of 6-phase alternating current is found in alternators and therefore these alternators require a rectifier bridge having 12 power switches. Other lesser common alternators have a 5-phase or 7-phase alternating current and therefore respectively require a rectifier bridge having 10 or 14 power switches. As well known to those skilled in the art, more switches than 2*n may be utilized if switches are connected in parallel or if switches are utilized to rectify the neutral point of the stator winding. Most commonly, the type of power switch is a diode, but other types of switches may also be utilized such as FETS, MOSFETS or any other type of electric switch. Three of these switches are the positive switches, and these positive switches are connected between the phase terminals of the stator windings of the alternator and the positive terminal B+ of the alternator which is connected to the battery and the electrical circuit of the vehicle. Three further switches, namely the negative switches, are connected between electrical ground or earth of the vehicle and the aforementioned phase terminals of the stator windings.

The positive and negative switches make up a rectifier bridge that is subjected to high current. Hence, it is necessary to cool the switches in the most effective way possible. To this end, the switches are commonly mounted on metal members arranged on the outside of the alternator. The metal members not only serve as mounting members, but also serve as a heat sink designed to dissipate heat produced by the switches. The switches are typically grouped on two carrier members, one of which is reserved for the positive switches (i.e., a positive carrier member), and the other for the negative switches (i.e., a negative carrier member). The rectifier switches may be inserted by pressure in receiving bore holes of the carrier member/heat sink, or may be soldered to the carrier member using appropriate solder alloys. The end wires connected to the rectifier switches enable the rectifier switches to be connected to the leads of the stator windings of the electric machine.

In such an alternator arrangement where the rectifier bridge is mounted on carrier members, the negative carrier member is connected to a vehicle ground/battery return path. The vehicle ground/battery return path is often provided by the engine itself, including a path through the alternator housing. Therefore, the negative carrier member may be provided by the alternator housing itself. On the other hand, the positive carrier member is connected to a terminal and an electrical cable connects the terminal to the positive terminal of the vehicle battery. The negative carrier member must be electrically isolated from the positive carrier member. Accordingly, an insulator must be inserted between the positive carrier member and the negative carrier member. The insulator is typically configured to provide both electrical isolation and a desired spatial separation between the positive and negative carrier members.

FIG. 9 shows a cross-sectional view of an end portion (e.g., a slip ring end) of a typical alternator including an alternator housing 112 serving as the negative carrier member, and a heat sink 130 serving as the positive carrier member. A terminal assembly 140 sits on top of the positive carrier member and includes posts that extend through an opening of positive carrier member. The terminal assembly includes electrical traces 46 providing electrically conductive lines that make connections from the switches 128 to the leads of the stator windings of the electric machine. As noted previously, the positive carrier member 130 must be electrically isolated from the negative carrier member 112. Therefore, an insulator 200 is positioned between the positive carrier member 130 and the negative carrier member 112. The insulator is comprised of an insulating material such as polyphenylene sulfide (PPS), and must be sufficient in thickness to provide a desired separation between the positive carrier member and the negative carrier member. The insulator, terminal assembly, positive carrier member, and negative carrier member are fixed together by bolts, rivets or other fasteners that may extend from the terminal assembly to the housing. As shown in FIG. 9, a bolt 148 has a head that abuts the terminal assembly and a threaded portion that extends through the terminal assembly and positive carrier member and is threaded in a receptacle in the negative carrier member (i.e., the alternator housing).

While the foregoing arrangement provides an effective arrangement for mounting an electronics package to an alternator, there are numerous parts which are relatively expensive, and each of these parts must be maintained and handled during the manufacturing process. Accordingly, it would be desirable to provide an alternator arrangement having an electronics package that may be mounted to the alternator with fewer parts. It would also be advantageous if the alternator arrangement resulted in reduced component costs and reduced complexity during the manufacturing process.

SUMMARY

In accordance with at least one embodiment of the disclosure, there is provided an electronics package for an alternator. The electronics package includes a positive carrier member having an inner side and an outer side, a plurality of switches connected to the positive carrier member, and a terminal assembly engaging the positive carrier member. The terminal assembly includes an electrically insulative portion and a plurality of electrical traces attached to the electrically insulative portion. The electrically insulative portion includes a post extending from the inner side to the outer side of the positive carrier member, a first shoulder engaging the outer side of the positive carrier member, and a second shoulder engaging the inner side of the positive carrier member. The second shoulder is provided by a deformed segment of the post. The post, first shoulder, and second shoulder are all formed as a unitary component.

Pursuant to another embodiment of the disclosure, an alternator includes a plurality of windings, a rectifier, a carrier member, and a unitary terminal assembly. The rectifier is electrically connected to the windings and includes a plurality of diodes mounted on the carrier member. The carrier member includes a first surface and a second surface opposite the first surface. A unitary terminal assembly is coupled to the carrier member. The unitary terminal assembly includes an insulative portion with electrical traces extending through the insulative portion. The electrical traces provide a connection between the plurality of diodes and the plurality of windings. The insulative portion of the unitary terminal assembly engage both the first surface and the second surface of the carrier member, including a first shoulder engaging the first surface of the carrier member and a second shoulder engaging the second surface of the carrier member.

In accordance with yet another embodiment of the disclosure there is provided an electronics package for an alternator comprising a carrier member and a terminal assembly. The carrier member includes an inner side and an outer side. The terminal assembly engages the carrier member. The terminal assembly includes an electrically insulative portion and a plurality of electrical traces. The electrically insulative portion includes a post extending from the outer side to the inner side of the carrier member, and a shoulder engaging the inner side of the carrier member. The shoulder is provided by a deformed segment of the post.

The above described features and advantages, as well as others, will become more readily apparent to those of ordinary skill in the art by reference to the following detailed description and accompanying drawings. While it would be desirable to provide an electric machine with an electronics package that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
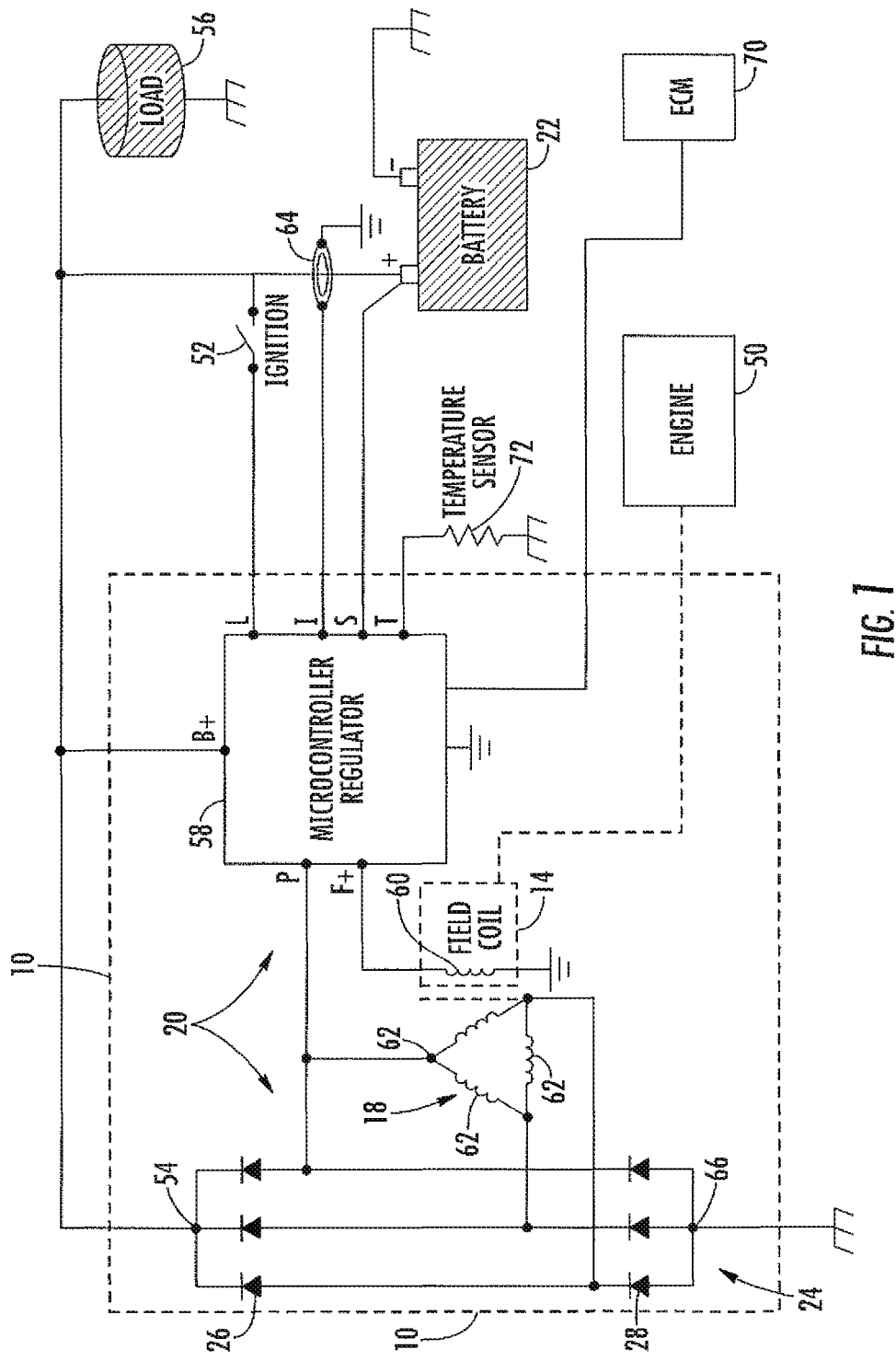
FIG. 1 shows schematic diagram of a vehicle electrical system including an electric machine having an electronics package.

Disclosed herein is an alternator 10 for a vehicle. As generally shown in FIG. 2, the alternator 10 includes an electronics package including a positive carrier member 30, a negative carrier member 32, a terminal assembly 40, and at least one fastener 48 connecting the positive carrier member 30 and the terminal assembly 40 to the negative carrier member 32. The general arrangement of the alternator 10 is first discussed below with reference to FIGS. 1 and 2, followed by a discussion of FIGS. 3-7 disclosing a specific embodiment of the terminal assembly configured and arranged in a manner that separates the positive carrier member 30 from the negative carrier member 32.

Figure 2:
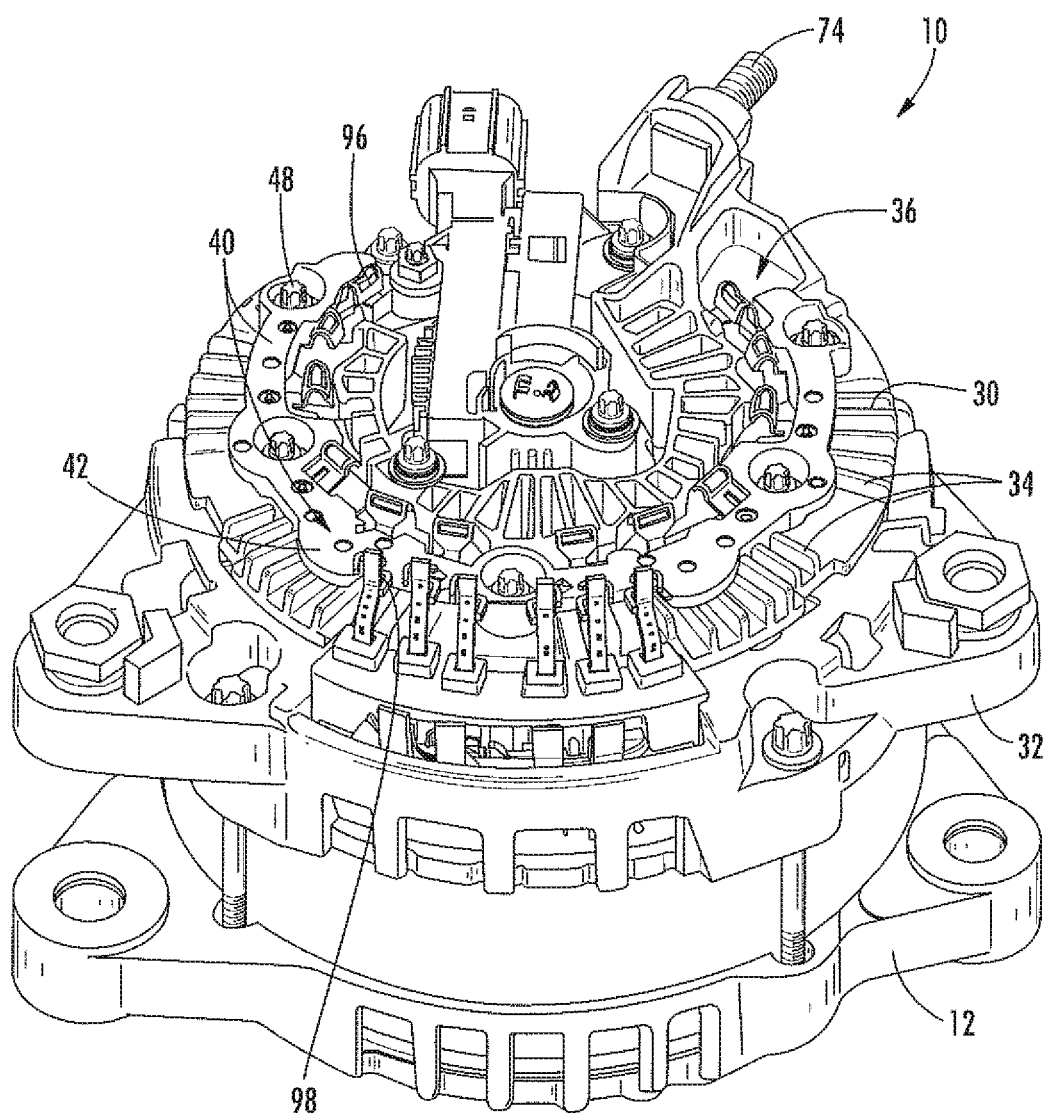
FIG. 2 shows a perspective view of an end portion of the electric machine of FIG. 1 including a carrier and a unitary insulator and terminal assembly.

Referring now to FIG. 1, the alternator 10 is shown in schematic form positioned in a vehicle 8. The vehicle 8 includes an engine 50 and a battery 22 supported by a vehicle chassis. The word "vehicle" as used herein refers to any device designed to carry or transport something or someone, including, without limitation, cars, trucks, boats, trains and planes. The engine 50 provides a drive torque for moving the vehicle 8.

The engine 50 is operably coupled to the rotor 14 of the alternator 10 such that operation of the engine 50 results in rotation of the rotor 14 and its field coil. In particular, when an ignition switch 52 is closed, electrical current from the battery 22 is delivered to a starter motor (not shown). When the starter motor is energized, it cranks the engine 50. When the engine 50 fires, the rotor 14 spins and the alternator 10 generates an output voltage at node 54. The output voltage of the alternator 10 is utilized to electrically charge the battery 22 and is also utilized by other electrical devices of the vehicle 8 as represented by the vehicle load 56.

As shown in FIG. 1, the alternator 10 may be defined to include those components positioned within or connected to an alternator housing 12 (represented by way of illustration as a dotted line box in FIG. 1). Accordingly, the alternator 10 includes the rotor 14, the stator 18, a rectifier 24, and a voltage regulator 58. The alternator housing 12 is typically a metal casing, such as a steel casing or a cast aluminum casing. However, it will be recognized that the housing 12 could also be comprised of any other suitable material.

The rotor 14 is positioned on a rotatable shaft and the stator 18 is stationary within the housing 12. The rotor 14 of the alternator 10 includes a field coil 60 that receives current from the regulator 58 as controlled by the regulator operating a field current control program.

The stator 18 is stationary within the alternator and includes windings 62 positioned around the rotor 14. The stator 18 generates an output current having a magnitude that is based on the current through the field coil 60. The stator 18 is electrically coupled to the rectifier 24, which delivers the alternator output current at node 54.

As shown in FIGS. 1 and 2, an electronics package 20 is mounted on the end of the housing 12 and is connected to a vehicle battery 22. The electronics package includes the regulator 58 and a rectifier 24. The regulator 58 generally includes a processor or chip configured to receive inputs and control a current to the field coil 60. Accordingly, the regulator 58 includes a voltage input (B+ or S) that provides a signal indicative of the voltage at the positive terminal of the battery 22. Based at least in part on this signal, the regulator 58 controls current through the field coil 60, and therefore an associated output voltage and an output current from the alternator 10. The regulator determines the proper field coil current based on the various regulator inputs, which may include, for example, signals from an engine control module (ECM) 70, temperature sensor 72, current sensor 64, ignition switch 52, stator windings, battery 22, and any of various other signals.

Figure 3:
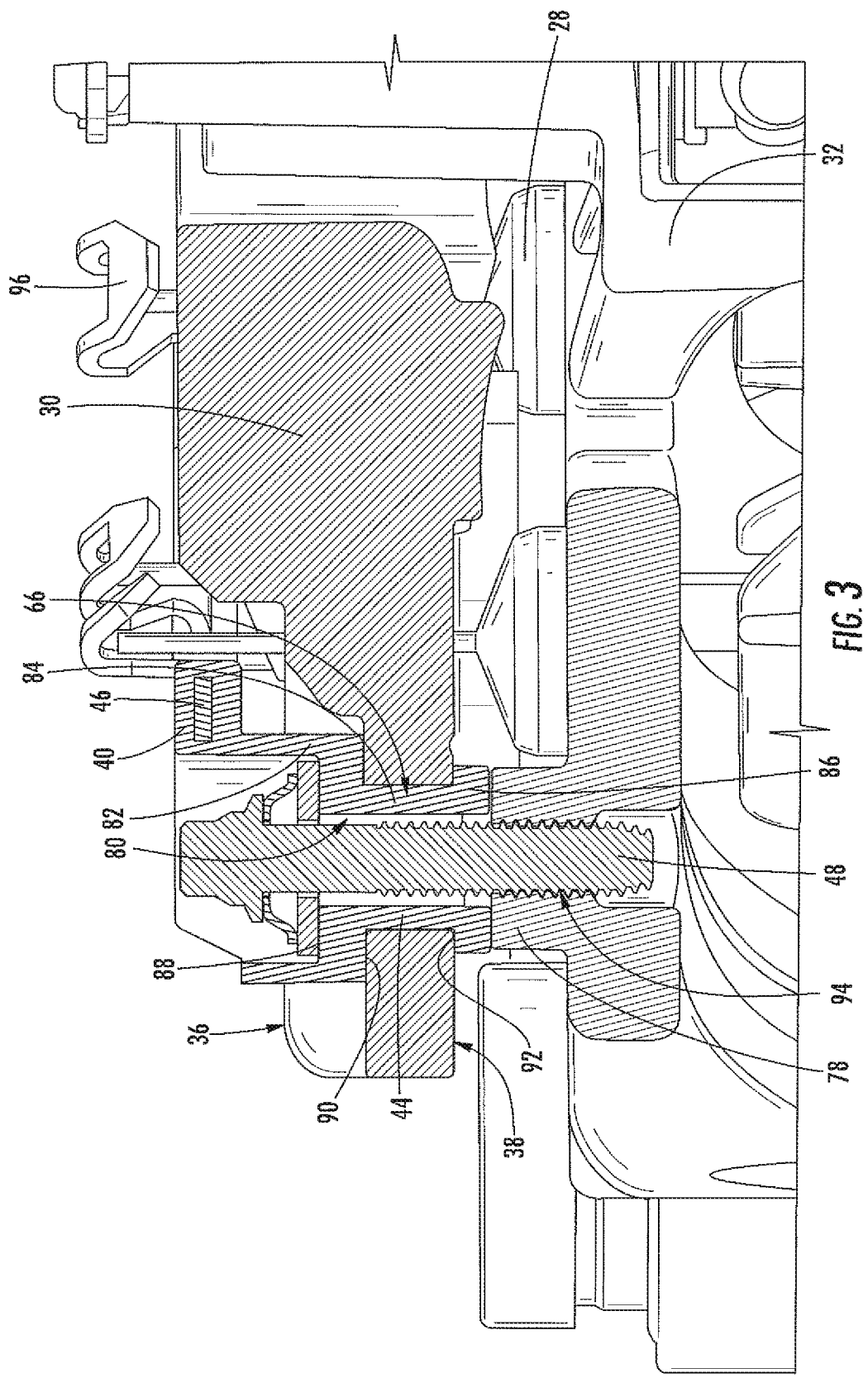
FIG. 3 shows a cross-sectional view of an end portion of the electric machine of FIG. 2 including the carrier and the unitary insulator and terminal assembly.

The rectifier 24 of the electronics package 20 includes a plurality of positive switches 26 and a plurality of negative switches 28. The positive switches 26 and negative switches 28 may be provided by diodes, FETS, MOSFETS or any other type of electric switch, as will be recognized by those of ordinary skill in the art. With particular reference to FIGS. 2 and 3, the positive switches 26 are retained by a positive carrier member 30 and the negative switches 28 are retained by a negative carrier member 32. The terminal assembly 40 provides electrical connections between the positive switches 26 and the negative switches 28 and the stator windings 62. In addition, as explained in further detail below, the terminal assembly 40 also separates and electrically insulates the positive carrier member 30 from the negative carrier member 32.

With continued reference to FIGS. 2 and 3, the negative carrier member 32 is provided by an end portion of the alternator housing 12. The negative carrier member 32 is designed to conduct current and also act as a heat sink for the negative switches 28 of the rectifier. Thus, the negative carrier member 32 is generally comprised of a material having good electrical and thermal conduction properties. For example, the negative carrier member 32 may be comprised of a material such as aluminum or steel. The negative carrier member 32 may be provided as a relatively thin member in the form of a plate which may have a contoured surface with various surface features to facilitate mounting and heat transfer. However, it will be recognized by those skilled in the art that the negative carrier member 32 may also be provided in forms that may not be considered a plate. Examples of heat transfer features on the negative carrier member 32 include fins, ribs or other features that provide for heat transfer qualities, allowing the negative carrier member 32 to better serve as a heat sink for the negative switches 28. Examples of mounting features on the negative carrier member 32 include bosses 78, as shown in FIG. 3, formed on the outer surface of the negative carrier member 32. It will be recognized by those skilled in the art that the surface features such as the bosses 78 and the heat transfer features may be optional. The bosses 78 can be cylindrical in shape and extend above the majority of the outer surface of the negative carrier member. A threaded hole 94 is formed at the center of the bosses 78. The switches 28 may be retained on the surface of the negative carrier member 32 in any of a number of ways, such as in a friction fit in surface features of the negative carrier member 32 or using an adhesive or epoxy material. The alternator housing 12, including the negative carrier member 32, is electrically connected to chassis ground for the vehicle 8. Thus, the negative carrier member 32 is electrically connected to the negative terminal of the battery 22.

The positive carrier member 30 is positioned next to, but separated from the negative carrier member 32 on the end of the alternator housing 12. Similar to the negative carrier member 32, the positive carrier member 30 is also designed to conduct current while also acting as a heat sink for the positive switches 26 of the rectifier 24. Thus, the positive carrier member 30 is generally comprised of a material having good electrical and thermal conduction properties. For example, the positive carrier member 30 may be comprised of a material such as aluminum or copper. The positive carrier member 30 may be provided as a relatively thin member in the form of a plate which may have a contoured surface with various surface features to facilitate mounting and heat transfer. However, it will be recognized by those skilled in the art that the positive carrier member 30 may also be provided in forms that may not be considered a plate. In at least one embodiment, the positive carrier member 30 may be provided as a C-shaped plate that it is relatively flat and thin and has a generally semi-circular footprint. Examples of heat transfer features that may be included on the positive carrier member 30 include fins, ribs or other features that provide for additional heat transfer qualities, allowing the positive carrier member 30 to better serve as a heat sink for the positive switches 26. The positive carrier member 30 includes an outer surface 36 on a side opposite the negative carrier member 32, and an inner surface 38 that faces the negative carrier member 32. The inner surface 38 may be substantially smooth and flat. In contrast, the outer surface 36 is relatively contoured.

A plurality of holes 66, 67, 68 are provided on the positive carrier member 30. These holes 66, 67, 68 provide passages from the outer surface 36 to the inner surface 38 of the positive carrier member 30. Holes 66 are configured to receive the terminal assembly 40; holes 67 are configured for passage of cooling air; holes 68 are configured to receive the positive switches 26 or pass leads to the negative switches 28. The switches 26 may be retained on the surface of the positive carrier member 30 in any of a number of ways, such as in a friction fit in the holes 68 or other surface features of the positive carrier member 30 or using an adhesive or epoxy material. The positive carrier member 30 is also connected to a B+ terminal 74, thus connecting the positive switches 26 to the positive terminal of the battery 22.

The terminal assembly 40 is connected to the positive carrier member 30. The terminal assembly includes a C-shaped plate portion 42 that provides a substantially arcuate main body with an inner side/surface and an outer side/surface. A plurality of posts 44 extend from an inner surface of the plate portion 42. The plate portion 42 and posts 44 are primarily comprised of an insulating material, such as PPS or other insulative plastic. A plurality of electrical traces 46 extend through the plate portion 42, embedded in the insulating material. These electrical traces 46 are configured to provide connections between the switches 26, 28 and the stator windings 62. Accordingly, the electrical traces 46 extend between and provide connections between switch leads 96 and winding leads 98, as will be recognized by those of ordinary skill in the art.

As shown in FIG. 3, the posts 44 of the terminal assembly 40 are configured to extend completely through the holes 66 in the positive carrier member 30, with the posts 44 extending from the outer surface 36 to the inner surface 38 of the positive carrier member 30. Each post 44 of the terminal assembly includes several different segments 82, 84, 86 of different diameters. A first segment 82 of the post 44 has a diameter that is greater than the diameter of the holes 66 in the positive carrier member 30. This first segment 82 is positioned on the outer side of the positive carrier member 30. A second segment 84 of the post 44 has a diameter that is less than the holes 66 in the positive carrier member 30. This second segment 84 extends through one of the holes 66. A third segment 86 of the post 44 has a diameter that is greater than the diameter of the holes 66 in the positive carrier member 30. This third segment 86 is positioned on the inner side of the positive carrier member 30. A first shoulder 90 is formed between the first segment 82 and the second segment 84 of the post 44. A second shoulder 92 is formed between the second segment 84 and the third segment 86 of the post 44. The first shoulder 90 engages the outer surface 36 of the positive carrier member 30. The second shoulder 92 engages the inner surface 38 of the positive carrier member 30.

With continued reference to FIG. 3, the terminal assembly 40 includes a plurality of passages 80 in the form of holes that extend completely through the terminal assembly from the outer side of the positive carrier member 30 to the ends of the posts 44. The passages 80 are configured to receive the threaded portion of a bolt 48 or other fastener member. A shoulder 88 is formed in each passage 80 such that the head of the bolt 48 engages the shoulder 88 and prevents the bolt 48 from passing completely through the passage 80. The positive carrier member 30, negative carrier member 32, and terminal assembly 40 are all retained on the end of the alternator housing 12 by the fasteners 48 that extend through holes 80 in the terminal assembly 40 and the holes 66 of the positive carrier member 30 and into the threaded hole 94 on the negative carrier member 32 (i.e., the end of the alternator housing 12).

With continued reference to FIG. 3, the terminal assembly 40 is formed as a unitary component. The term "unitary component" as used herein refers to a component where the constituent parts of a component non-removably joined together such that the constituent parts may not be separated without destruction of the component or one or more of the constituent parts. The insulative portion of the terminal assembly 40 is continuous from the C-shaped plate portion 42 to the ends of the posts 44 (i.e., to the third segment 86 of the post 44). Accordingly, the insulative portion of the terminal assembly 40 may be formed by a process such as injection molding, or any other process resulting in a component that is substantially uniform throughout, and the component non-separable into constituent parts without destruction of the component. The electrical traces 46 are attached to the insulative portion of the terminal assembly 40. If the terminal assembly 40 is formed by a molding process, the electrical traces 46 of the terminal assembly 40 may be co-molded with the insulative portion, i.e. the electrical traces 46 positioned in the mold prior to injection of the resin that forms the insulative portion. The electrical traces 46 may also be attached to the insulative portion of the terminal assembly by a bonding, snapping, or similar process.

Figure 4:
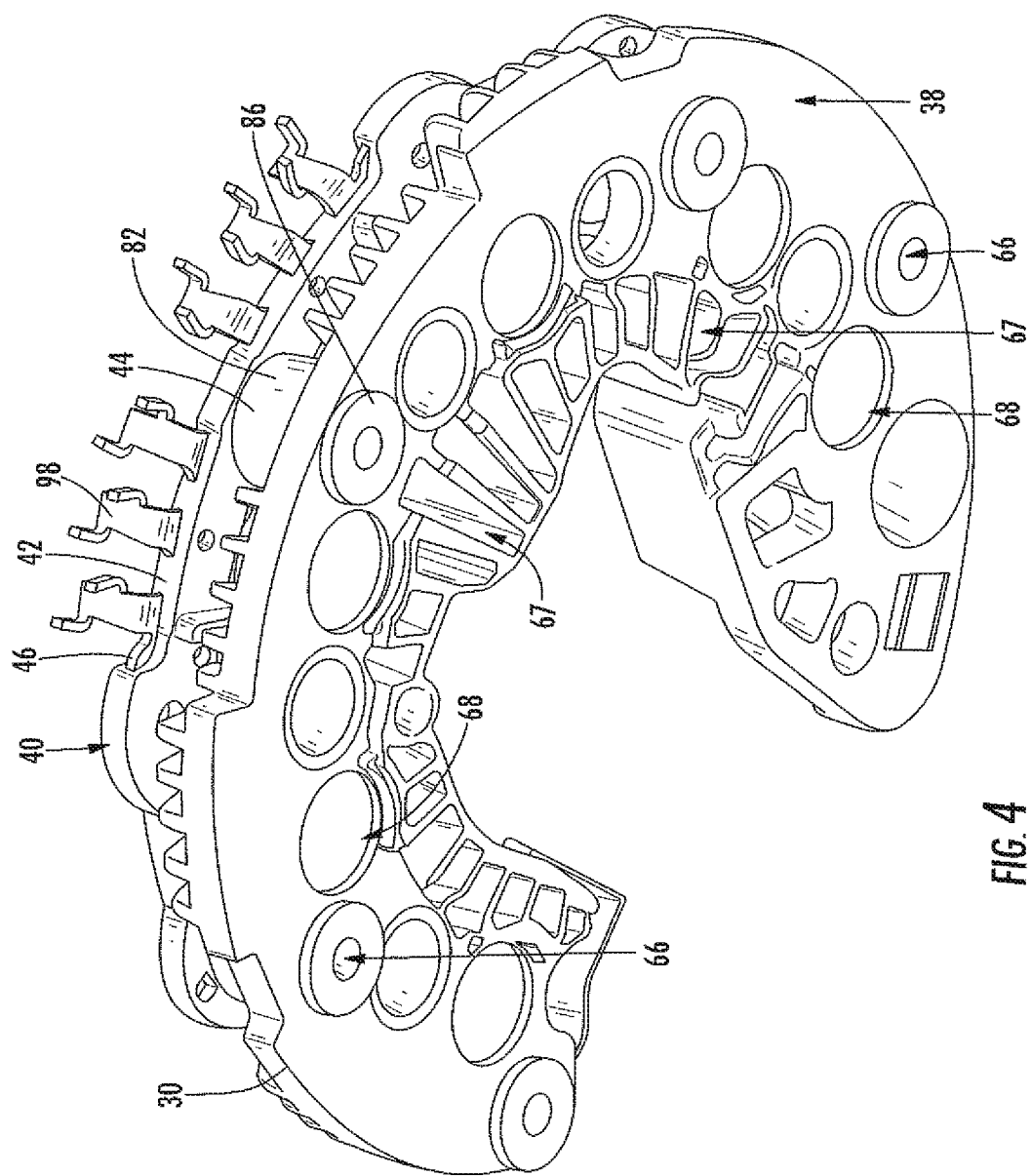
FIG. 4 shows a perspective view of the carrier and the terminal assembly from an inner side of the carrier.

As noted in the preceding paragraph, the terminal assembly 40 is a unitary component that includes a post 44. This post 44 engages both the outer surface 36 of the positive carrier member 30 and the inner surface 38 of the positive carrier member 30. As shown in FIG. 3, shoulder 90 formed between the first segment 82 and the second segment 84 of the post 44 engages the outer surface positive carrier member 30. Shoulder 92 formed between the second segment 84 and the third segment 86 of the post 44 engages the inner surface of the positive carrier member 30. FIG. 4 shows a perspective view of the positive carrier member 30 and the terminal assembly 40 from an inner side (i.e., alternator side) of the positive carrier member 30, thus showing the inner surface 38 of the positive carrier member 30 with the third segment 86 of the post 44 engaging the inner surface 38. As can be seen in FIG. 4, the third segment 86 of the post 44 of the terminal assembly 40 has a diameter that is greater than the diameter of the hole 66 of the positive carrier member 30, and thus the third segment 86 of the post 44 covers the hole 66 from the perspective of FIG. 4.

With reference again to FIG. 3, the third segment 86 of the post 44 is sandwiched between the positive carrier member 30 and the negative carrier member 32. Accordingly, the third segment 86 of the post 44 engages both the inner surface of the positive carrier member and the outer surface of the negative carrier member 32. The third segment 86 of the post may engage the outer surface of the negative carrier member 32 at the bosses 78. The bosses 78 extend above the majority of the outer surface of the negative carrier member 32, thus distancing the majority of the outer surface of the negative carrier member 32 from the inner surface 38 of the positive carrier member 30. Moreover, the third segment 86 of the terminal assembly post 44 further distances the positive carrier member 30 from the negative carrier member 32 and electrically insulates the positive carrier member 30 from the negative carrier member 32. In at least one embodiment, it is desirable to have at least 3 mm of clearance (in the axial direction) between the positive carrier member 30 and the negative carrier member 32 in order to reduce the chances of corrosion on the members 30, 32 and to further electrically insulate the members 30, 32. Accordingly, the bosses 78 may be about 2.5-5 mm in height and the third segment 86 of the terminal assembly post 44 may be about 0.5-3 mm in height. When a taller boss 78 is used in the design, a shorter third segment 86 of the terminal assembly post 44 may be used. As previously mentioned, the boss 78 is optional. If the design option has no bosses 78, then the third segment 86 of the terminal assembly post 44 may be 2.5-6 mm. However, a shorter third segment 86 is desirable in order to lessen the creep of the plastic forming the third segment 86.

Figure 5:
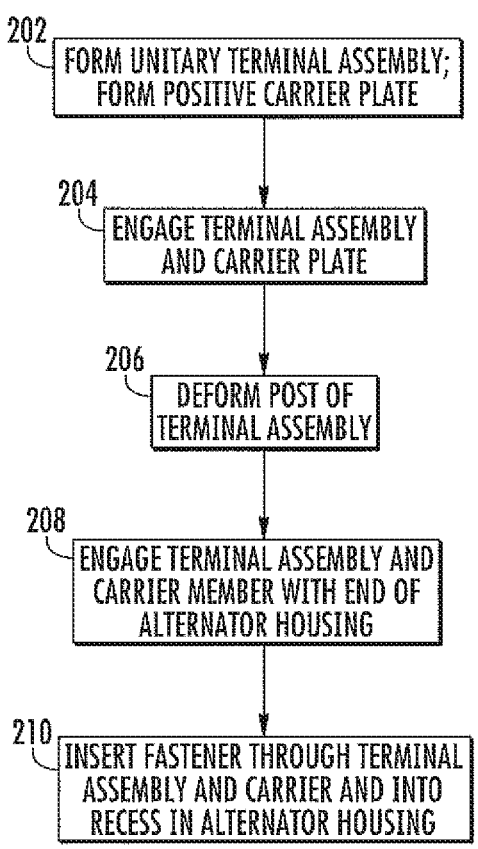
FIG. 5 shows a flow chart of a method for assembling the end portion of the electric machine of FIG. 2 including the carrier and the unitary insulator and terminal assembly.

With reference now to FIG. 5, a method of forming the post 44 of the terminal assembly is now described. The described method results in the post 44 of the unitary terminal assembly engaging both the inner surface and the outer surface of the positive carrier member. The method begins with step 202 wherein the terminal assembly 40 is initially formed with each post 44 having only two segments, including the first segment 82 (having a first diameter) and an extended version of the second segment 84 (having a second diameter that is less than the first diameter). During this step 202, the positive carrier member 30 is also formed, including holes 66 configured to receive the posts 44. Each hole 66 has a diameter sized to pass the second segment 84 of the post 44 but block passage of the first segment 82 of the post 44.

Figure 6:
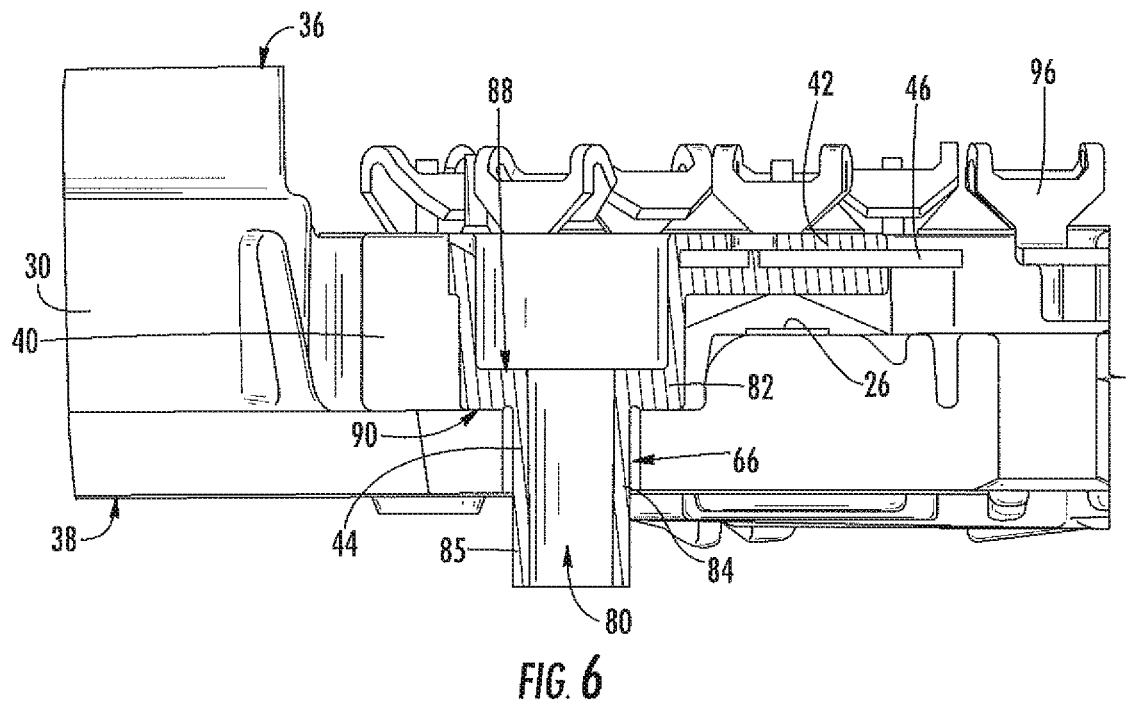
FIG. 6 shows a cross-sectional view of the carrier and the unitary insulator and terminal assembly of FIG. 4 following deformation of the post of the terminal assembly.
Figure 7:
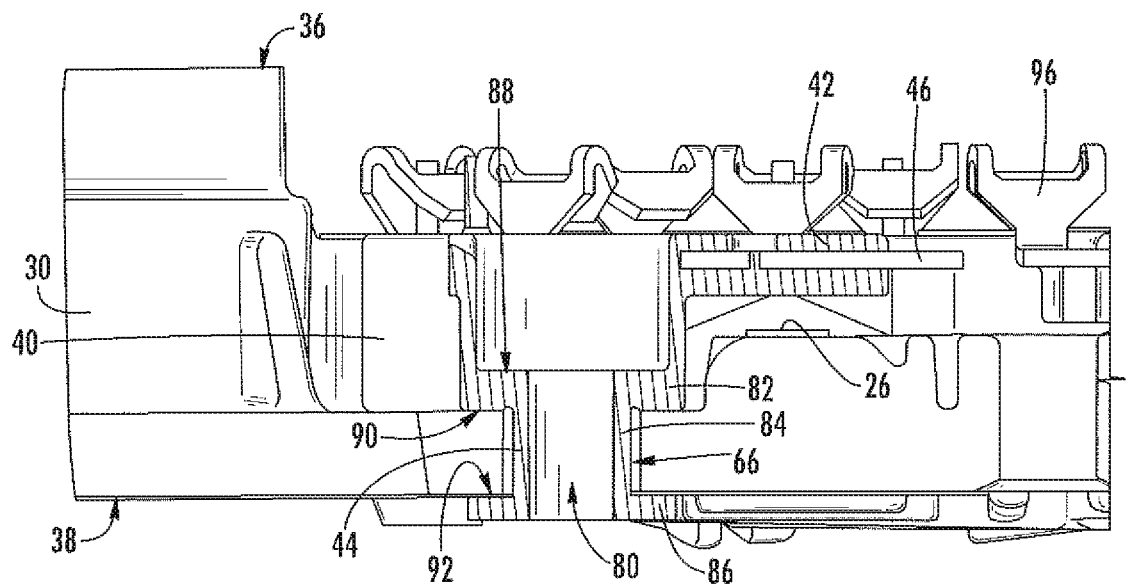
FIG. 7 shows an inner perspective view of the carrier and the unitary insulator and terminal assembly of FIG. 5.

In step 204, the posts 44 are inserted into the holes 66 in the positive carrier member 30. When the posts 44 are inserted into the holes 66, the first segment 82 engages the outer surface 36 of the positive carrier member 30 at the shoulder 90, and the second segment 84 extends through the hole 66 in the positive carrier member 30. As a result, an end portion 85 of the second segment 84 extends past the inner surface 38 of the positive carrier member 30, as shown in FIG. 6. Next, at step 206, the end portion 85 of the second segment 84 is heat staked or otherwise deformed. This deformation results in formation of the third segment 86 of the post 44 of the terminal assembly, as shown in FIG. 7. This third segment 86 provides a head on the post having a diameter that is greater than the diameter of the hole 66 in the positive carrier member 30. When all of the posts 44 are heat staked in this manner, the terminal assembly 40 is connected to the positive carrier member 30, resulting in an arrangement such as that shown in FIG. 4.

With continued reference to FIG. 5, in step 208 the positive carrier member 30 and terminal assembly 40 arrangement is then engaged with the end of the alternator housing that provides the negative carrier member 32. Next, in step 210, bolts 48 or other fasteners are inserted through the passages 80 in the terminal assembly, causing the threaded portions of the bolts to pass through the posts 44 and holes 66 in the positive carrier member 30, and into the threaded holes 94 in the negative carrier member 32. When the bolts are tightened, the positive carrier member 30 and terminal assembly 40 are fixed in place to the negative carrier member 32 on the end of the alternator 10.

Figure 8:
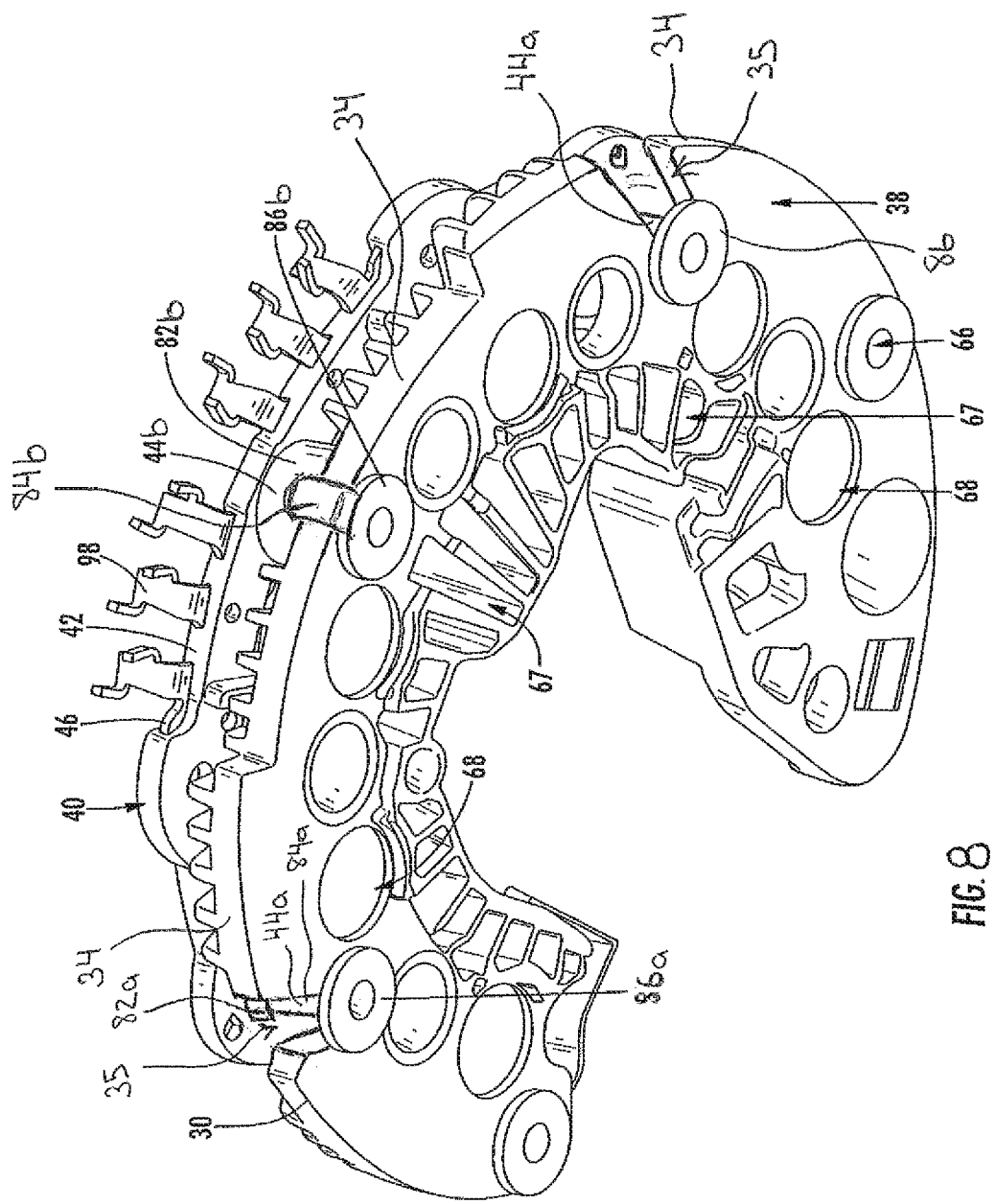
FIG. 8 shows an alternative embodiment of the carrier and the terminal assembly of FIG. 4 from an inner side of the carrier.
Figure 9:
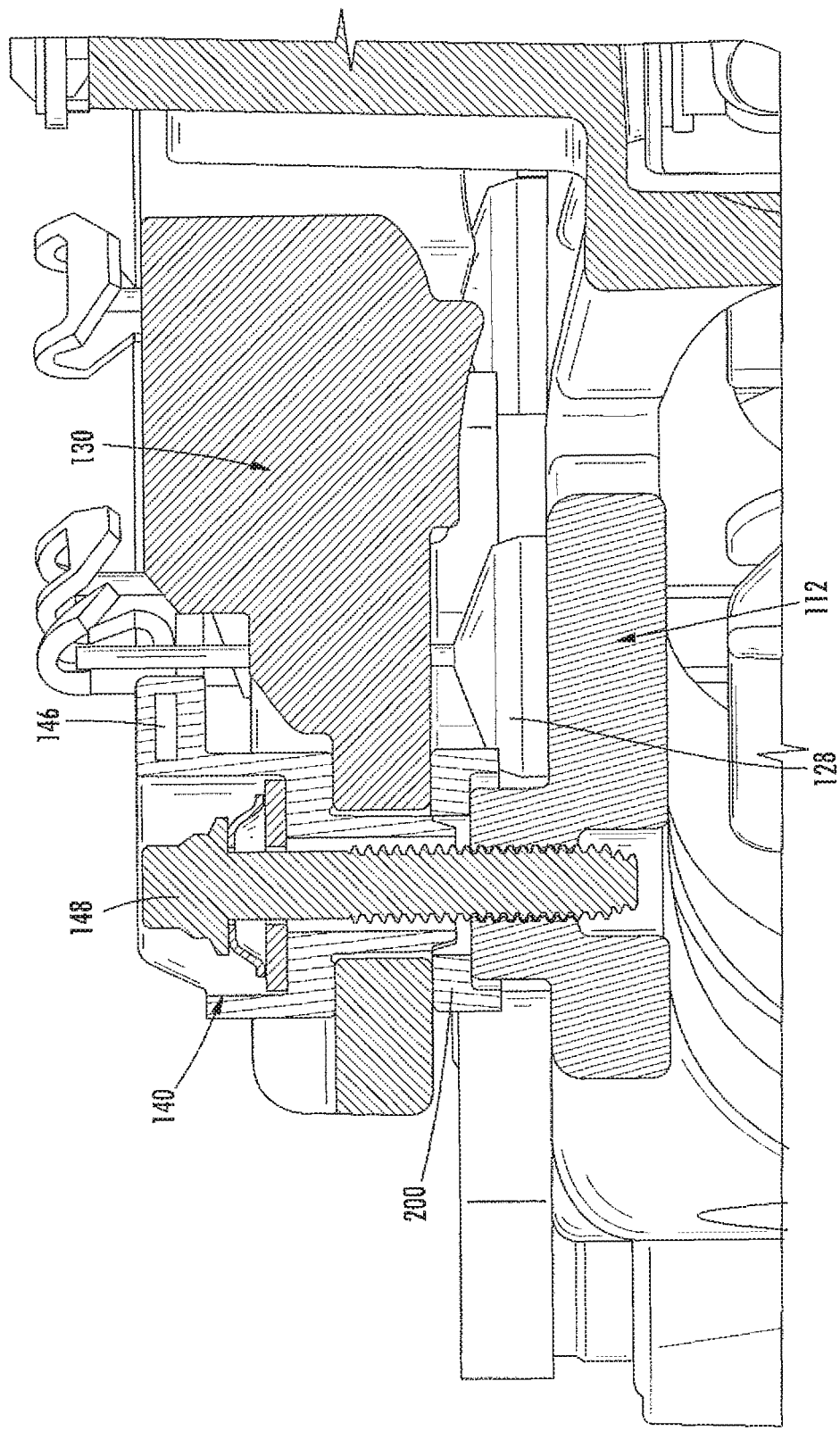
FIG. 9 shows a cross-sectional view of a prior art terminal assembly and insulator.

The foregoing detailed description of one or more embodiments of the electric machine with combined insulator and terminal assembly has been presented herein by way of example only and not limitation. For example, in at least one embodiment as shown in FIG. 8, at least one post 44a of the terminal assembly 40 extends through a passage in the positive carrier member 30 which is provided as a recess 35 formed in a perimeter edge 34 of the carrier member 30. This recess 35 may be considered a hole at the perimeter edge 34 of the carrier member 30 because the recess disrupts the continuity of the carrier member 30, and particularly the perimeter edge 34, and forms a passage from the inner side to the other side of the carrier member 30. Because the recess 35 does not completely encircle the post 44a, the post 44a is therefore exposed in the recess 35. Similar to the previously described embodiments, the first segment 82a of the post 44a is enlarged at the outer side of the carrier member 30, the second segment 84a is thinner and relatively elongated and straight, and the third segment 86a is enlarged at the inner side of the carrier member 30.

In yet another embodiment as shown in FIG. 8, another post 44b of the terminal assembly 40 extends completely around the perimeter edge 34 of the positive carrier member 30 without passing through any passage through the positive carrier member 30. In this embodiment, the second segment 84b of the post 44b extends radially outward from the first segment 82 of the post 44b at the outer side of the carrier member 30 and to the perimeter edge 34 of the carrier member 30. The second segment 84b of the post 44b then extends around the perimeter edge 34 of the carrier member 30 and to the inner side of the carrier member 30. The second segment 84b of the post 44b then extends radially inward to third segment 86b of the post located on the inner side of the carrier member. In this manner, the post 84b is configured to extend from the outer side to the inner side of the carrier member 30 without extending through any recesses, holes or other passages in the carrier member.

As shown by the foregoing description, the electric machine with combined insulator and terminal assembly is not limited to any particular embodiment, including the exemplary embodiments disclosed herein. Moreover, there are advantages to individual advancements described herein that may be obtained without incorporating other aspects of various embodiments described above. Therefore, the spirit and scope of the appended claims should not be limited to the description of those embodiments contained herein.

What is claimed is:

1. An electronics package for an alternator comprising:
   a positive carrier member including an inner side, an outer side;
   a plurality of switches connected to the positive carrier member; and
   a terminal assembly engaging the positive carrier member, the terminal assembly including an electrically insulative portion and a plurality of electrical traces attached to the electrically insulative portion, the electrically insulative portion including a post extending from the inner side to the outer side of the positive carrier member, a first shoulder engaging the outer side of the positive carrier member, and a second shoulder engaging the inner side of the positive carrier member, the second shoulder provided by a deformed segment of the post, the post, first shoulder, and second shoulder formed as a unitary component.

2. The electronics package of claim 1 wherein the second shoulder engaging the inner side of the positive carrier member is configured as a heat staked shoulder formed on the inner side of the positive carrier member.

3. The electronics package of claim 1, the first shoulder defined by a first surface substantially perpendicular to the post, and the second shoulder defined by a second surface substantially perpendicular to the post.

4. The electronics package of claim 1 further comprising a ground member engaging the second shoulder of the terminal assembly, the second shoulder separating the ground member from the positive carrier member.

5. The electronics package of claim 4 wherein the plurality of switches is a first plurality of switches, the electronics package further comprising a second plurality of switches connected to the ground member.

6. The electronics package of claim 5 wherein the first plurality and second plurality of switches are connected to provide a rectifier.

7. The electronics package of claim 4 further comprising a fastener extending through the post and into the ground member such that the terminal assembly and the positive carrier member are fastened to the ground member.

8. The electronics package of claim 4 wherein the ground member is a housing of the alternator.

9. The electronics package of claim 1 wherein the positive carrier member is in a C-shaped plate form.

10. The electronics package of claim 1, the positive carrier member including a plurality of fins configured to dissipate heat.

11. The electronics package of claim 1 wherein the insulative portion includes a substantially arcuate main body with an inner side and an outer side, the post extending from the inner side of the main body.

12. The electronics package of claim 1 wherein the electrical traces of the terminal assembly are co-molded with the insulative portion.

13. The electronics package of claim 1 wherein the post of the terminal assembly extends through a hole in the positive carrier member.

14. The electronics package of claim 1 wherein the post of the terminal assembly extends around a perimeter edge of the positive carrier member.

15. The electronics package of claim 14 wherein at least one recess is defined along the perimeter edge of the positive carrier, and the post of the terminal assembly extends through the at least one recess.

16. The electronics package of claim 15 wherein the electrically insulative portion is comprised of a material defined by a mechanical strength that prevents the first shoulder and the second shoulder from being non-destructively forced into the at least one recess.

17. An electronics package for an alternator comprising:
   a carrier member including an inner side, an outer side; and
   a terminal assembly engaging the carrier member, the terminal assembly including an electrically insulative portion and a plurality of electrical traces, the electrically insulative portion including a segment extending from the outer side to the inner side of the carrier member, and a shoulder engaging the inner side of the carrier member, the shoulder provided by a deformation of the segment.

18. The alternator of claim 17 wherein a recess is defined along a perimeter edge of the carrier member, wherein the electrically insulative portion of the terminal assembly includes a post extending across the perimeter edge of the carrier member via the recess.

* * * * *